(12) United States Patent
Adler et al.

(10) Patent No.: US 8,746,055 B2
(45) Date of Patent: Jun. 10, 2014

(54) RAIN INTENSITY SENSOR

(76) Inventors: Jeffrey Scott Adler, Beaconsfield (CA); Harold Russell Baird, Marietta, GA (US)

(*) Notice: Subject to any disclaimer, the term of this patent is extended or adjusted under 35 U.S.C. 154(b) by 183 days.

(21) Appl. No.: 13/507,955

(22) Filed: Aug. 9, 2012

(65) Prior Publication Data
US 2014/0041448 A1 Feb. 13, 2014

(51) Int. Cl.
*G01W 1/00* (2006.01)
(52) U.S. Cl.
USPC .................................. 73/170.17; 73/170.16
(58) Field of Classification Search
None
See application file for complete search history.

(56) References Cited

U.S. PATENT DOCUMENTS

| | | | |
|---|---|---|---|
| 5,780,718 A * | 7/1998 | Weber | 73/29.01 |
| 5,783,743 A * | 7/1998 | Weber | 73/29.01 |
| 6,802,205 B2 * | 10/2004 | Barguirdjian et al. | 73/73 |
| 7,200,921 B2 * | 4/2007 | Loibl | 29/611 |
| 7,204,130 B2 * | 4/2007 | Koram et al. | 73/73 |
| 7,263,875 B2 * | 9/2007 | Hawk et al. | 73/73 |
| 7,296,461 B2 * | 11/2007 | Barguirdjian et al. | 73/73 |

* cited by examiner

*Primary Examiner* — Lisa Caputo
*Assistant Examiner* — Jermaine Jenkins

(57) ABSTRACT

Described herein is a rain intensity sensor. The sensor includes a circuit, which includes a resistor and at least two spaced apart electrically conductive strips electrically connected in series to the resistor. The resistor is located between the conductive strips. The conductive strips are sufficiently spaced apart such that when a raindrop contacts with the conductive strips provides a resistive path therebetween and which is electrically parallel with the resistor.

20 Claims, 3 Drawing Sheets

RAIN INTENSITY SENSOR

TECHNICAL FIELD

The present relates to moisture sensors, and more particularly to a rain intensity sensor (RIS).

BACKGROUND

Rain sensors are commonplace for detecting the presence of rain on occasions where such detection is desired. However, most rain sensors rely on moving mechanisms and/or active electronic components, which have performance limitations or, in some cases, may be prohibitively expensive to manufacture and operate.

A number of rain sensors are currently used for irrigation control. One such example, described in U.S. Pat. No. 4,919,165, has a container for sensing a preset rainfall. Disadvantageously, this rain sensor is unable to distinguish between the preset rainfall and heavy rainfall. The sensor returns to a dry state quickly in sunlight, causing the irrigation controller to begin watering prematurely if the rainfall was heavy.

Another example is the Bosch vehicle windshield rain sensor (Optical Sensor U.S. Pat. No. 6,376,824 to Michenfelder et al) used to operate windshield wipers. This sensor depends on the change in refraction of a reflected light beam against glass when water is on the outer glass surface. Natural light, such as sunlight, can trigger false indications when aligned with the sensor field of view.

Another example of a rain sensor is described in U.S. Pat. No. 5,505,082 and uses a turbine wheel rotated by passing funneled water drops over it, and requires replaceable filters to prevent jamming the mechanism.

In another example, U.S. Pat. No. 4,578,995 describes a rain sensor which requires an active electronic circuit to detect a change when raindrops bridge two parallel rods. Similarly, the rain sensor described in U.S. Pat. No. 4,520,667 passes funneled raindrops over two vertically spaced grids and uses a complicated electronic circuit to count drops and display results.

In another example, U.S. Pat. No. 4,305,280 determines rainfall rates by using active electronics to measuring the power required to evaporate rainfall water as it arrives.

Thus, there is a need for an improved, yet simplified rain intensity sensor which addresses one or more of the above-mentioned shortcomings.

BRIEF SUMMARY

Accordingly, there is provided a rain intensity sensor, the sensor comprising:
 a circuit which includes:
 (i) a first resistor; and
 (ii) at least two spaced apart electrically conductive strips electrically connected in series to the first resistor, the first resistor being located between the conductive strips, the conductive strips being sufficiently spaced apart such that a raindrop in contact with the conductive strips provides a reduced resistive path therebetween and which is electrically parallel with the first resistor.

In one example, the circuit is a voltage divider in which one of the electrically conductive strips is connected in series to a second resistor, a voltage tap, which is connected between the second resistor and the electrically conductive strip, and ground. The second resistor is located to receive a reference voltage applied thereto. The sensor is configured such that when a raindrop contacts the at least two conductive strips, the resistance therebetween decreases to the parallel resistance of the first resistor and the raindrop resistive path thereby reducing the voltage tap.

In one example, the sensor is configured such that when a plurality of raindrops contact the at least two conductive strips the voltage tap is further reduced so as to permit measurement of the number of raindrops.

In one example, the sensor further includes a temperature sensor electrically connected to a controller.

In another example, the electrically conductive strips and the first resistor are mounted on a non-electrically conductive material.

In one example, the conductive elements are mounted on one side of a printed circuit board and the first and second resistors are located on the other side of the printed circuit board. The sensor further includes a temperature sensor located on the other side of the printed circuit board. The sensor is a negative temperature coefficient resistor.

In one example, the sensor includes a plurality of the electrically conductive strips electrically interconnected in series with a plurality of the first resistors, the electrically conductive strips being spaced apart by a plurality of gaps. The sensor includes a cover plate and a gasket mounted on a printed circuit board. The printed circuit board is angled to permit raindrops to roll downwardly away from the circuit board.

In another example, the sensor is for use on greenhouses, atriums, windows, freezer glass doors, skylights; on planes, helicopters; food services, freezers/fridges, spacecraft, buildings; for landscaping such as grass and garden maintenance, crops; or for weather determination, climate, ecosystem preservation; or for medical applications and storage of tissues and cells, sterilizations; or for food preparation and preservation.

In another example, the sensor is mounted for use on motorized transportation including trucks, cars, motor bikes, recreational vehicles, trains, or boats.

In another example, the sensor is mounted for use on solar panels.

In another example the sensor is mounted for use on trough reflectors,

In another example, the sensor is useful for sprinkler systems for landscaping, grass and garden maintenance, farming applications, crops or irrigation.

In another example, the sensor is mounted for use with a solar panel autonomous cleaning device.

In another example, the sensor is mounted for use with a ramp cleaning device.

BRIEF DESCRIPTION OF THE DRAWINGS

In order that the discovery may be readily understood, embodiments are illustrated by way of example in the accompanying drawings.

DETAILED DESCRIPTION

Figure 1:
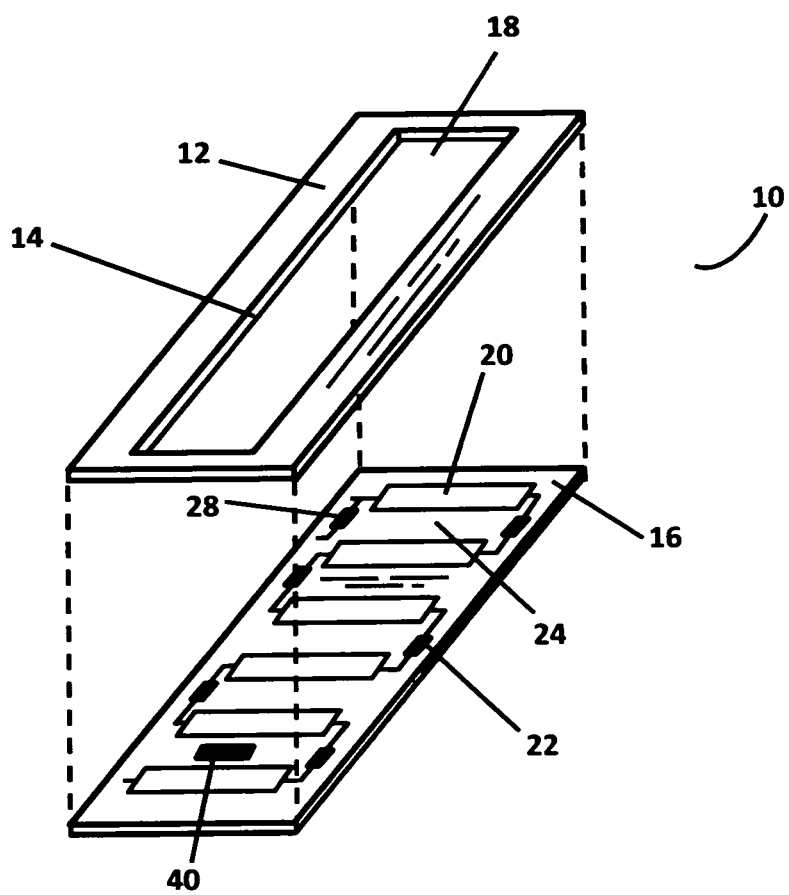
FIG. 1 is an exploded perspective view of a rain sensor.
Figure 2:
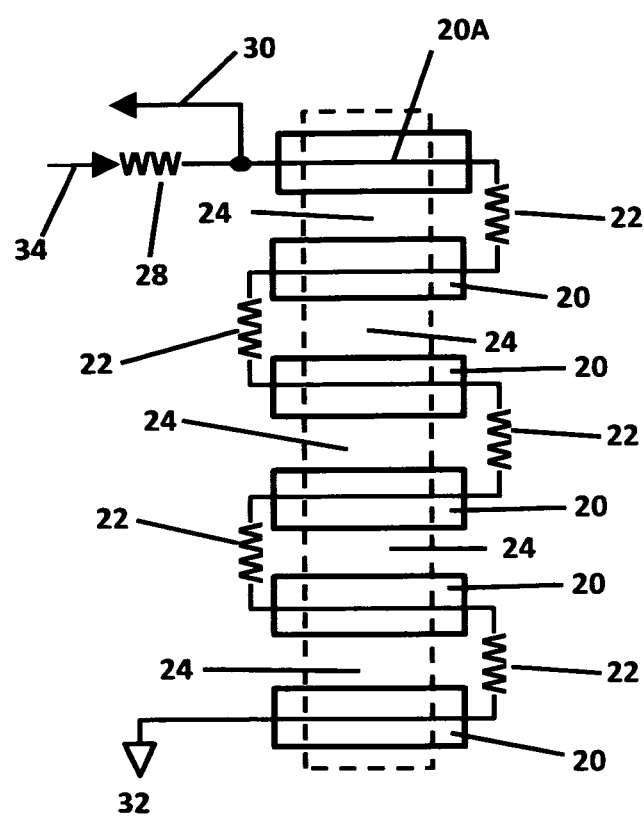
FIG. 2 is a circuit diagram showing a plurality of electrically conductive strips and resistors.

Referring now to FIGS. 1 and 2, a rain intensity sensor is shown generally at 10 and includes a cover plate 12 with a sealing gasket 14 mounted on a printed circuit board 16. The sealing gasket 14 surrounds a window 18 which is located over a circuit 19. As illustrated, the circuit 19 includes a plurality of electrically conductive strips (elements) 20 and a plurality of resistors 22 electrically interconnected in series. The electrically conductive strips 20 are spaced apart by a plurality of non-electrically conductive gaps 24. The window 18 is located over respective portions of the electrically conductive strips 20 and the gaps 24 so that raindrops falling onto the sensor 10 contact only the electrically conductive strips 20 and the gaps 24 therebetween. The electrically conductive strips 20 and the resistors 22 are mounted on a non-electrically conductive material. Suitable non-conducting material includes, for example, glass, ceramics, plastic, and the like. The electrically conductive strips 20 may be a conductive foil mounted with conductive adhesive, printed circuit conductive areas, thin film deposit conductors, and the like. The electrically conductive strips 20 may be straight as illustrated, or shaped as spirals, waves, zig zags, and the like. Additional devices and circuitry known to those skilled in the art those practiced for functions such as cabling, voltage supply, ground, signal buffering, user communication, rain sensor and temperature sensor signal processing, may also be added to the circuit as desired.

One skilled in the art will readily understand that the rain intensity sensor 10 can use used with any type of solar panel and trough reflector technology. In particular, the rain intensity sensor 10 can be used with the inventor's "Solar Panel Autonomous Cleaning Device", and "Ramp Cleaning Device for Solar Energy Technologies", which are described in co-pending United States patent applications, the contents of which are hereby incorporated by reference.

Referring specifically to FIG. 2, the circuit 19 is a voltage divider in which one of the electrically conductive strips 20A is connected in series to a second resistor 28, a voltage tap 30, connected between the resistor 28 and the electrically conductive strip 20A and ground 32, and the series resistance of one or more resisters 22. The second resistor 28 is located to receive a reference voltage 34 applied thereto.

Figure 3:
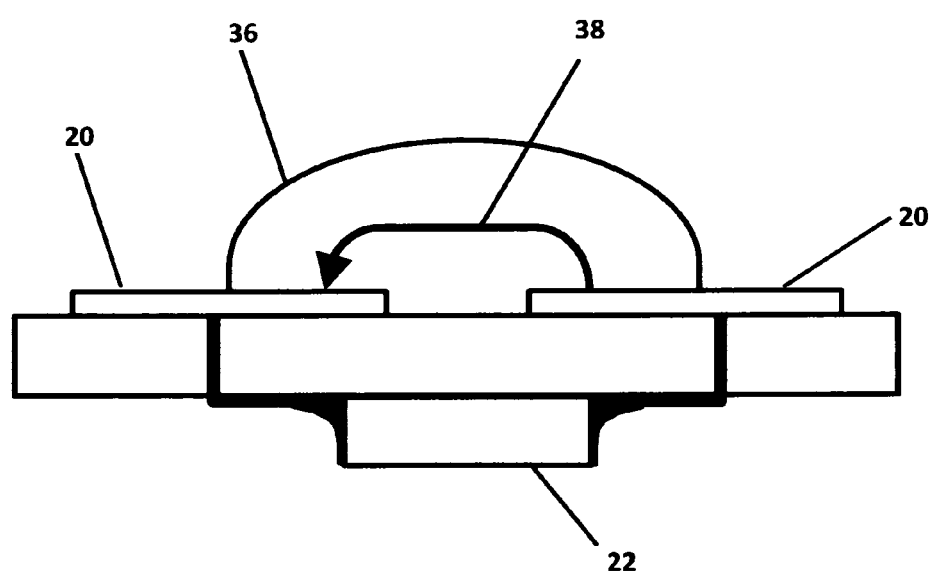
FIG. 3 illustrates a raindrop bridging two sensor conductive strips Further details of the sensor and its advantages will be apparent from the detailed description included below.

Still referring to FIG. 2, and now to FIG. 3, one resistor 22 and at least two of the spaced apart electrically conductive strips 20 are electrically connected in series. The resistor 22 is located between the two conductive strips 20. The conductive strips 20 are sufficiently spaced apart such that a raindrop 36 in bridging contact with the conductive strips 20 provides a raindrop resistive path 38 therebetween, which is electrically parallel with the resistor 22. The sensor 10 is configured such that when the raindrop 36 contacts at least two of the conductive strips 20, the resistance therebetween decreases to the parallel resistance of the resistor 22 and the raindrop resistive path 38, thereby reducing the voltage tap 30. The sensor 10 is configured such that when a plurality of raindrops 38 contact the at least two conductive strips 22, the voltage tap 30 is further reduced so as to permit measurement of the number of raindrops.

Referring again to FIG. 1, a temperature sensor 40 is electronically connected to controller 26. The temperature sensor 40 is a negative temperature coefficient (NTC) resister, or other suitable temperature sensor known to those skilled in the art. The electrically conductive strips 20 are mounted on one side of the printed circuit board 16, whereas the resistors 22, the resistor 28 and the temperature sensor 40 are located on the other side of the printed circuit board 16.

Rain intensity sensors 10 as described herein can be integrated with hazard notification systems to improve transportation safety by providing advance warning of potentially slippery or low visibility conditions. A rain intensity sensor 10 can be also integrated with a winter precipitation sensor to provide for windshield wiper type precipitation removal in all climates.

The rain intensity sensor 10 can be used for any number of applications such as, for example, greenhouses, atriums, windows, freezer glass doors, skylights; on planes, helicopters, and motorized transportation including trucks, cars, motor bikes, recreational vehicles, trains, boats and the like; food services, freezers/fridges, spacecraft, buildings, photovoltaic solar (conventional panels and non conventional solar applications), trough reflectors; for landscaping such as grass and garden maintenance, crops; or for weather determination, climate, ecosystem preservation; or for medical applications and storage of tissues and cells, sterilizations; or for food preparation and preservation, and the like. The sensor 10 is particularly useful for sprinkler systems for landscaping, grass and garden maintenance, farming applications, crops or irrigation.

Operation

Referring now to FIGS. 2 and 3, the operation of the rain intensity sensor 10 will be described. The temperature sensor 40 is used to determine when rain (and not snow or ice) is possible. The reference voltage 34 is then applied to the resister 28. In dry weather, the tap voltage 30 is determined by the following equation:

$$\text{Voltage } 30 = \frac{\text{Voltage } 34 \times \text{Sum of Resistances } 22}{\text{Resistance } 28 + \text{Sum of Resistances } 22}$$

When raindrops are present, as illustrated in FIG. 3, the resistance between the electrically conductive strips 20 is reduced to the parallel resistance of the resister 22 and the raindrop resistive path 38, thereby reducing tap voltage 130. Multiple concurrent raindrops bridging multiple conductive strips 20 further reduces tap voltage 30, so that tap voltage 30 effectively measures the number of raindrops on the sensor surface.

Referring now to FIG. 1, the sensor 10 is mounted at a tilt angle away from horizontal. This permits the raindrops to run off the sensor 10 downwardly. Since the raindrops are present on the sensor 10 for a short time period, accumulating raindrop counts over a period of, for example, one minute, effectively measures the rain intensity when a predetermined calibration factor is applied. Summing intensity over a longer time period produces accumulated rainfall.

Although the above description relates to a specific preferred embodiment as presently contemplated by the inventor, it will be understood that the RIS in its broad aspect includes mechanical and functional equivalents of the elements described herein.

We claim:

1. A rain intensity sensor, the sensor comprising:
    a circuit which includes:
        (i) a first resistor; and
        (ii) at least two spaced apart electrically conductive strips electrically connected in series to the first resistor, the first resistor being located between the conductive strips, the conductive strips being sufficiently spaced apart such that a raindrop in contact with the conductive strips provides a reduced resistive path therebetween and which is electrically parallel with the first resistor.

2. The sensor, according to claim 1, in which the circuit is a voltage divider in which one of the electrically conductive strips is connected in series to a second resistor, a voltage tap, which is connected between the second resistor and the electrically conductive strip, and ground.

3. The sensor, according to claim 2, in which the second resistor is located to receive a reference voltage applied thereto.

4. The sensor, according to claim 2, is configured such that when a raindrop contacts the at least two conductive strips, the resistance therebetween decreases to the parallel resistance of the first resistor and the raindrop resistive path thereby reducing the voltage tap.

5. The sensor, according to claim 4, is configured such that when a plurality of raindrops contact the at least two conductive strips the voltage tap is further reduced so as to permit measurement of the number of raindrops.

6. The sensor, according to claim 2, in which the conductive elements are mounted on one side of a printed circuit board and the first and second resistors are located on the other side of the printed circuit board.

7. The sensor, according to claim 6, further includes a temperature sensor located on the other side of the printed circuit board.

8. The sensor, according to claim 7, is a negative temperature coefficient resistor.

9. The sensor, according to claim 1, further includes a temperature sensor electrically connected to a controller.

10. The sensor, according to claim 1, in which the electrically conductive strips and the first resistor are mounted on a non-electrically conductive material.

11. The sensor, according to claim 1, includes a plurality of the electrically conductive strips electrically interconnected in series with a plurality of the first resistors, the electrically conductive strips being spaced apart by a plurality of gaps.

12. The sensor, according to claim 11, includes a cover plate and a gasket mounted on a printed circuit board.

13. The sensor, according to claim 12, in which the printed circuit board is angled to permit raindrops to roll downwardly away from the circuit board.

14. The sensor, according to claim 1, for use on is mounted for use with greenhouses, atriums, windows, freezer glass doors, skylights; on planes, helicopters; food services, freezers/fridges, spacecraft, buildings; for landscaping such as grass and garden maintenance, crops; or for weather determination, climate, ecosystem preservation; or for medical applications and storage of tissues and cells, sterilizations; or for food preparation and preservation.

15. The sensor, according to claim 1, is mounted for use on motorized transportation including trucks, cars, motor bikes, recreational vehicles, trains, or boats.

16. The sensor, according to claim 1, is mounted for use on solar panels.

17. The sensor, according to claim 1, is mounted for use on trough reflectors.

18. The sensor, according to claim 1, is useful for sprinkler systems for landscaping, grass and garden maintenance, farming applications, crops or irrigation.

19. The sensor, according to claim 1, is mounted for use with a solar panel autonomous cleaning device.

20. The sensor, according to claim 1, is mounted for use with a ramp cleaning device.

* * * * *